(12) United States Patent
Nageshappa et al.

(10) Patent No.: US 8,495,262 B2
(45) Date of Patent: Jul. 23, 2013

(54) USING A TABLE TO DETERMINE IF USER BUFFER IS MARKED COPY-ON-WRITE

(75) Inventors: Prashanth K. Nageshappa, Bangalore (IN); Sathiskumar Palaniappan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/953,234

(22) Filed: Nov. 23, 2010

(65) Prior Publication Data

US 2012/0131235 A1    May 24, 2012

(51) Int. Cl.
*G06F 3/00* (2006.01)
*G06F 13/28* (2006.01)

(52) U.S. Cl.
USPC .............................................. 710/52; 710/22

(58) Field of Classification Search
None
See application file for complete search history.

(56) References Cited

U.S. PATENT DOCUMENTS 5,182,805 A * 1/1993 Campbell ..................... 711/163
7,739,241 B2 6/2010 Boutcher
2006/0112136 A1 5/2006 Shankar et al.
2007/0033301 A1* 2/2007 Aloni et al. ..................... 710/22
2007/0162639 A1 7/2007 Chu et al.
2008/0104337 A1 5/2008 VelurEunni

FOREIGN PATENT DOCUMENTS

KR    1020000065846    11/2000

OTHER PUBLICATIONS

Eduard Brose, "ZeroCopy: Techniques, Benefits and Pitfalls," Hot Topics in Operating Systems, 2006.

* cited by examiner

*Primary Examiner* — Idriss N Alrobaye
*Assistant Examiner* — Richard B Franklin
(74) *Attorney, Agent, or Firm* — Robert A. Voigt, Jr.; Winstead, P.C.

(57) ABSTRACT

A method, system and computer program product for determining if a buffer is marked copy-on-write. A user applications selects a buffer in user space to store data involved in a write/read operation. The user application searches a table storing addresses of buffers in user space that are marked copy-on-write to determine if the address of the selected buffer is listed in the table. If the address is listed in the table, then the selected buffer is marked copy-on-write. If the address is not listed in the table, then the selected buffer is not marked copy-on-write. By having a table store a list of addresses of buffers in user space that are marked copy-on-write by the kernel, the user application is now able to know whether the buffer in user space is marked copy-on-write.

20 Claims, 6 Drawing Sheets

USING A TABLE TO DETERMINE IF USER BUFFER IS MARKED COPY-ON-WRITE

TECHNICAL FIELD

The present invention relates to computer networking, and more particularly to using a table to determine if the buffer in user space is marked copy-on-write.

BACKGROUND

The dramatic increase in networking speeds are causing processors to spend an ever increasing proportion of their time on networking tasks, leaving less time available for other work. High end computing architectures are evolving from Symmetric Multi-Processor (SMP) based designs to designs that connect a number of cheap servers with high speed communication links. Such distributed architectures typically require processors to spend a large amount of time processing data packets. Furthermore, emerging data storage solutions, multimedia applications, and network security applications are also causing processors to spend an ever-increasing amount of time on networking related tasks.

These bandwidth intensive applications typically use Transport Control Protocol (TCP) and Internet Protocol (IP) which are standard networking protocols used on the Internet, and the socket Application Programming Interface (API) which is a standard networking interface which is used to communicate over a TCP/IP network.

In order to efficiently utilize the bandwidth of a high speed link, TCP uses a sliding window protocol which sends data segments without waiting for the remote host to acknowledge previously sent data segments. This gives rise to two requirements. First, TCP needs to store the data until it receives an acknowledgement from the remote host. Second, the application must be allowed to fill new data in the memory buffer so that TCP can use the sliding window protocol to fill up the "pipe." Note that the system can satisfy both of these requirements by copying data between the user memory and the kernel memory. Specifically, copying data between the user memory and the kernel memory allows the application to fill new data in the user memory buffer, while allowing the kernel to keep a copy of the data in the kernel memory buffer until it receives an acknowledgement from the remote host.

Hence, in many systems, whenever data is written to (or read from) a socket (an endpoint for communication between two machines), the system copies the data from user memory to kernel memory (or from kernel memory to user memory). Unfortunately, this copy operation can become a bottleneck at high data rates.

Note that, during a socket write or read operation, the system usually performs a Direct Memory Access (DMA) transfer to transfer the data between the system memory and a Network Interface Card (NIC). However, this data transfer is not counted as a "copy" because the DMA transfer has to be performed anyways (i.e., it has to be performed even if the data is not copied between the kernel memory and the user memory), and the DMA transfer does not burden the Central Processing Unit (CPU).

As discussed above, the system copies data from user memory to kernel memory or vice-versa. In high-speed networks in which the capacity of a network link approaches or exceeds the CPU's processing capacity, the CPU spends nearly all of its time copying transferred data, and thus becomes a bottleneck which limits the communication rate to below the link's capacity. As a result, a concept known as "zero-copy," has come into being which describes computer operations in which the CPU does not perform the task of copying data from one memory area to another. In this manner, zero-copy operations reduce the number of time-consuming mode switches between user space and kernel space. System resources are utilized more efficiently since using a sophisticated CPU to perform extensive copy operations, which is a relatively simple task, is wasteful if other simpler system components can do the copying.

To further optimize this approach, a strategy, commonly referred to as "copy-on-write," is implemented so that data may not be copied between the user memory and the kernel memory or vice-versa. In the underlying kernel socket layer (kernel socket layer provides a convenient abstraction for communicating with remote applications) in kernel space, the kernel may mark the buffer in user space as copy-on-write. By marking the buffer "copy-on-write," the pages in the buffer are treated as if they were read-only. When data is attempted to be written to these pages, the Memory Management Unit (MMU) raises an exception which is handled by the kernel, which allocates new space in physical memory to store the new data. Furthermore, control data is placed in a buffer in kernel space. If the application does not modify the buffer in user space until the underlying TCP layer (contains networking applications that communicate with other networking applications over a network) receives the acknowledgement that the data has been successfully transferred to the remote host, then the kernel socket buffer is freed and the copy-on-write mapping is revoked. As a result, the buffer in user space will not be copied.

However, if the application modifies the buffer in user space prior to the receipt of the acknowledgement, then the buffer in user space needs to be copied thereby losing the benefit of implementing the copy-on-write strategy. In many system applications, the application will reuse the buffer in user space immediately as there is no means of knowing how long the buffer in user space is marked copy-on-write.

BRIEF SUMMARY

In one embodiment of the present invention, a method for determining if a buffer is marked copy-on-write comprises selecting a buffer in user space to store data. The method further comprises obtaining an address of the selected buffer in user space. In addition, the method comprises searching a table storing one or more addresses of buffers in user space that are marked copy-on-write to determine if the address of the selected buffer is listed in the table. Additionally, the method comprises selecting, by a user application whose instructions are executed by processor, an alternative buffer in user space to store data in response to the selected buffer being marked copy-on-write in the table.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for determining if a buffer is marked copy-on-write. In one embodiment of the present invention, a user application selects a buffer in user space to store data involved in a write/read operation. The user application searches a table storing addresses of buffers in user space that are marked copy-on-write to determine if the address of the selected buffer is listed in the table. If the address is listed in the table, then the selected buffer is marked copy-on-write. If the address is not listed in the table, then the selected buffer is not marked copy-on-write. By having a table store a list of addresses of buffers in user space that are marked copy-on-write by the kernel, the user application is now able to know whether the buffer in user space is marked copy-on-write.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
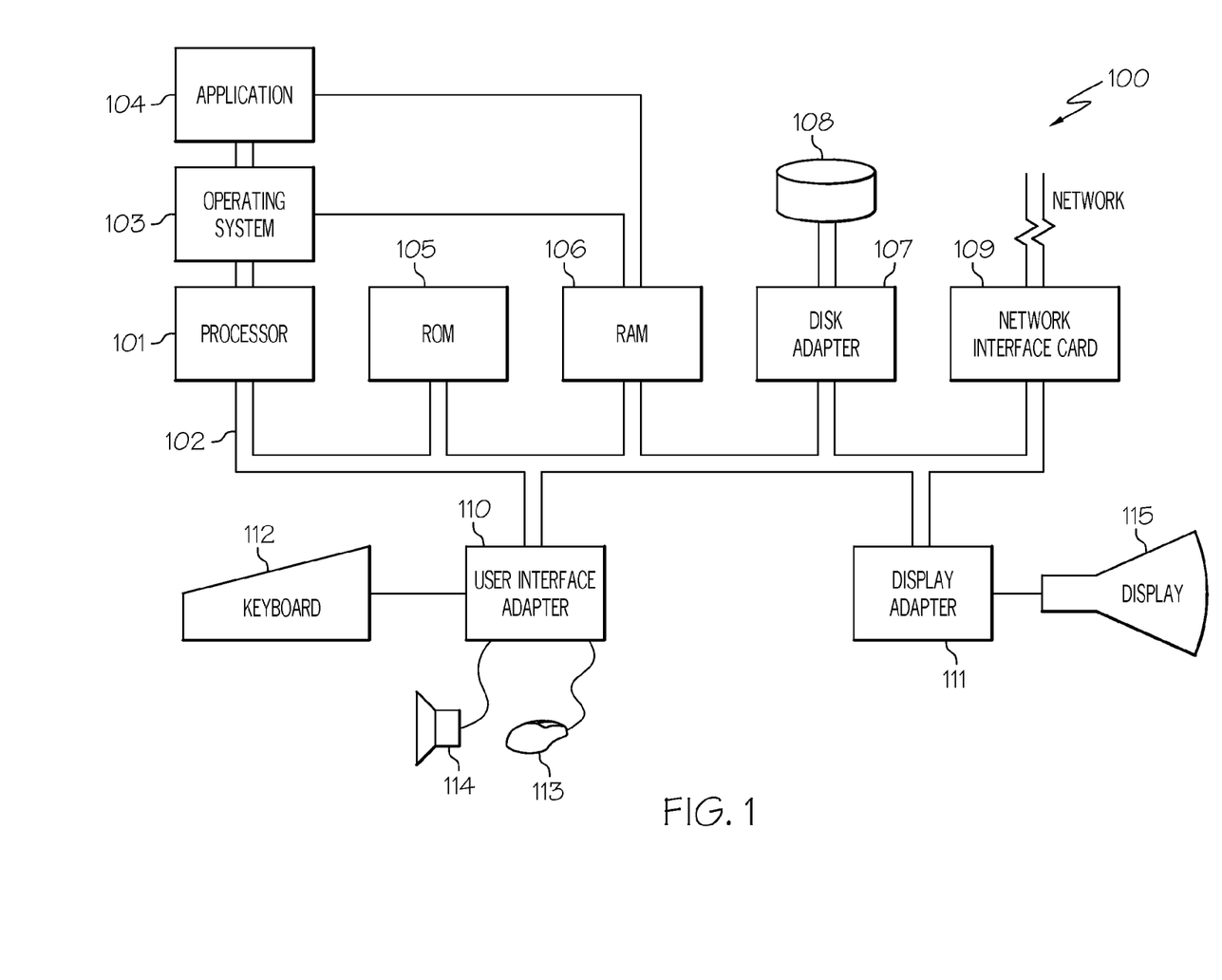
FIG. 1 is a hardware configuration of a computer system configured in accordance with an embodiment of the present invention.

Referring now to the Figures in detail, FIG. 1 illustrates an embodiment of a hardware configuration of a computer system 100 which is representative of a hardware environment for practicing the present invention. Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a user application that determines if a buffer in user space is marked copy-on-write, as discussed further below in association with FIGS. 2-3 and 5-6.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that program for determining if a buffer in user space is marked copy-on-write, as discussed further below in association with FIGS. 2-3 and 5-6, may reside in disk unit 108 or in application 104.

Computer system 100 may further include a network interface card 109 coupled to bus 102. Network interface card 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in the "copy-on-write" strategy, a buffer in user space is marked copy-on-write by the kernel thereby having the pages in the buffer to be treated as if they were read-only. If the application does not modify the buffer until the underlying TCP layer receives the acknowledgement that the data has been successfully transferred to the remote host, then the copy-on-write mapping is revoked. As a result, the buffer in user space will not be copied. However, in many system applications, the application will reuse the buffer in user space immediately as there is no means of knowing how long the buffer is marked copy-on-write.

Figure 2:
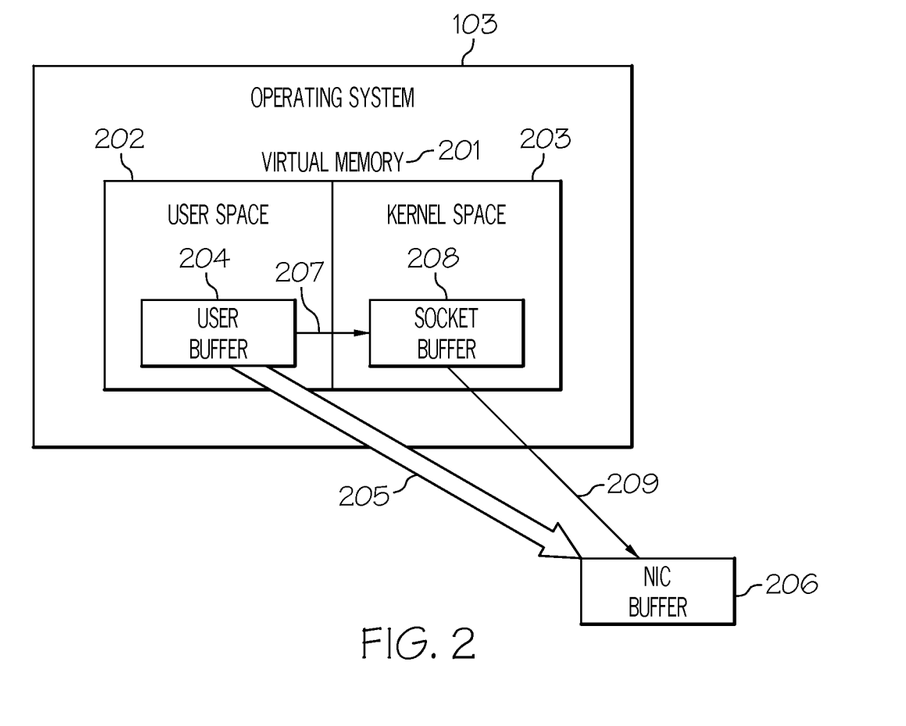
FIG. 2 illustrates the components of virtual memory that are involved in the write and read operations in accordance with an embodiment of the present invention.
Figure 3:
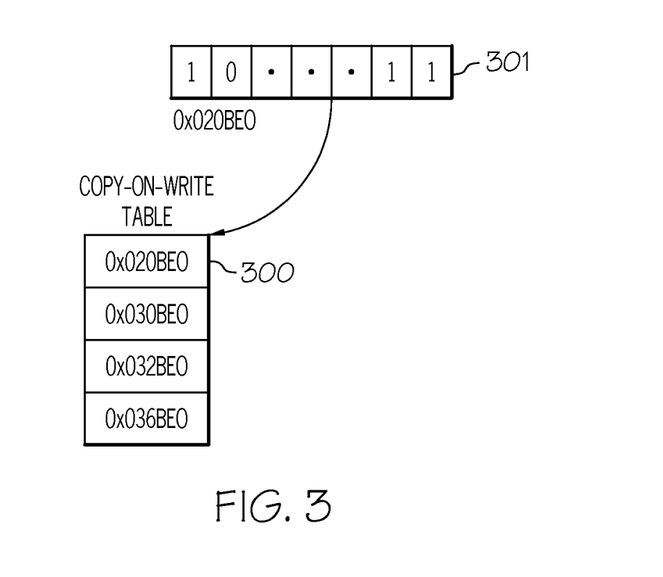
FIG. 3 illustrates a copy-on-write table used to store the addresses of buffers in user space that are marked copy-on-write by the kernel in accordance with an embodiment of the present invention.
Figure 4:
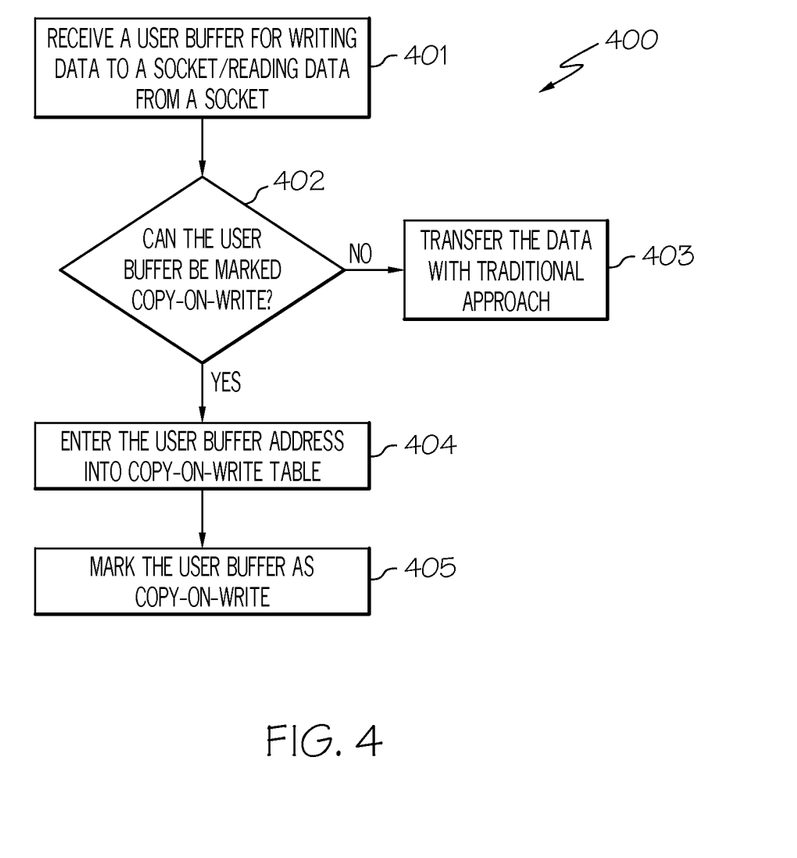
FIG. 4 is a flowchart of a method for creating an entry in the copy-on-write table by the kernel in accordance with an embodiment of the present invention.
Figure 5:
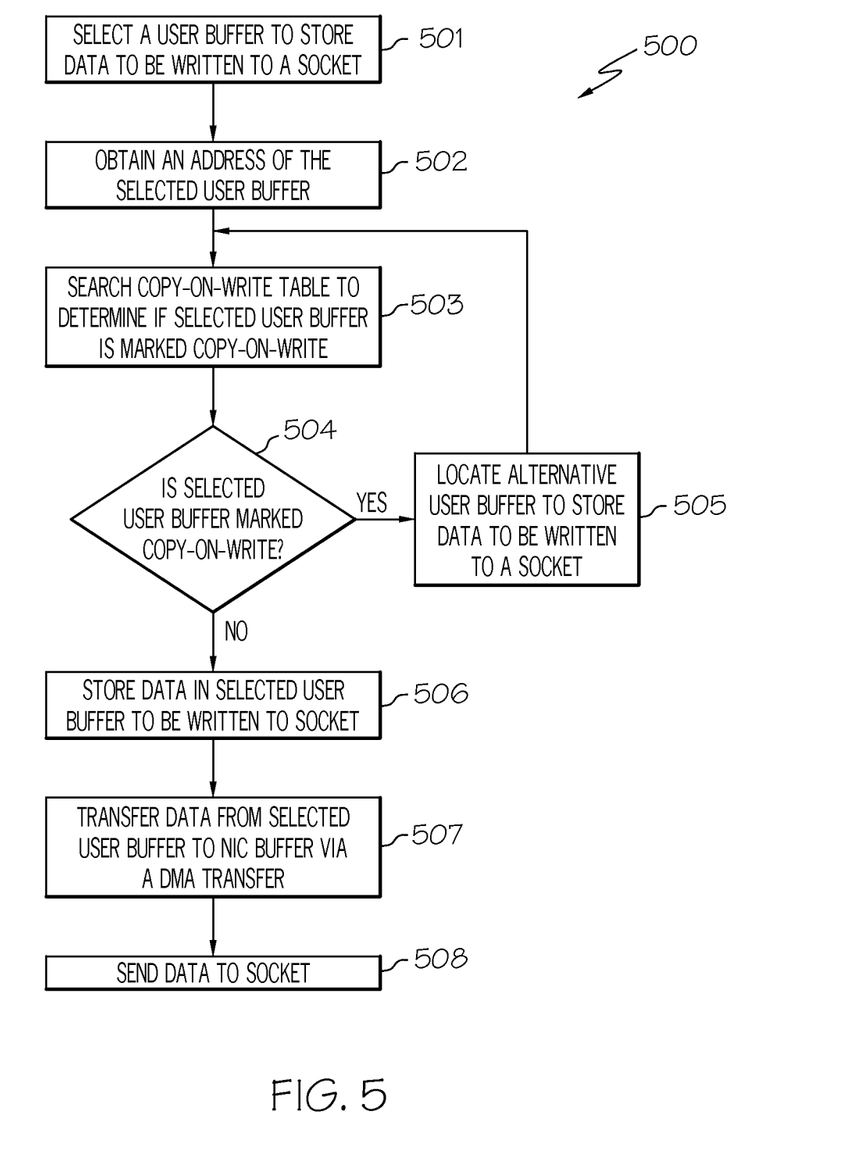
FIG. 5 is a flowchart of a method for determining if a user buffer is marked copy-on-write in connection with writing data to a socket in accordance with an embodiment of the present invention.
Figure 6:
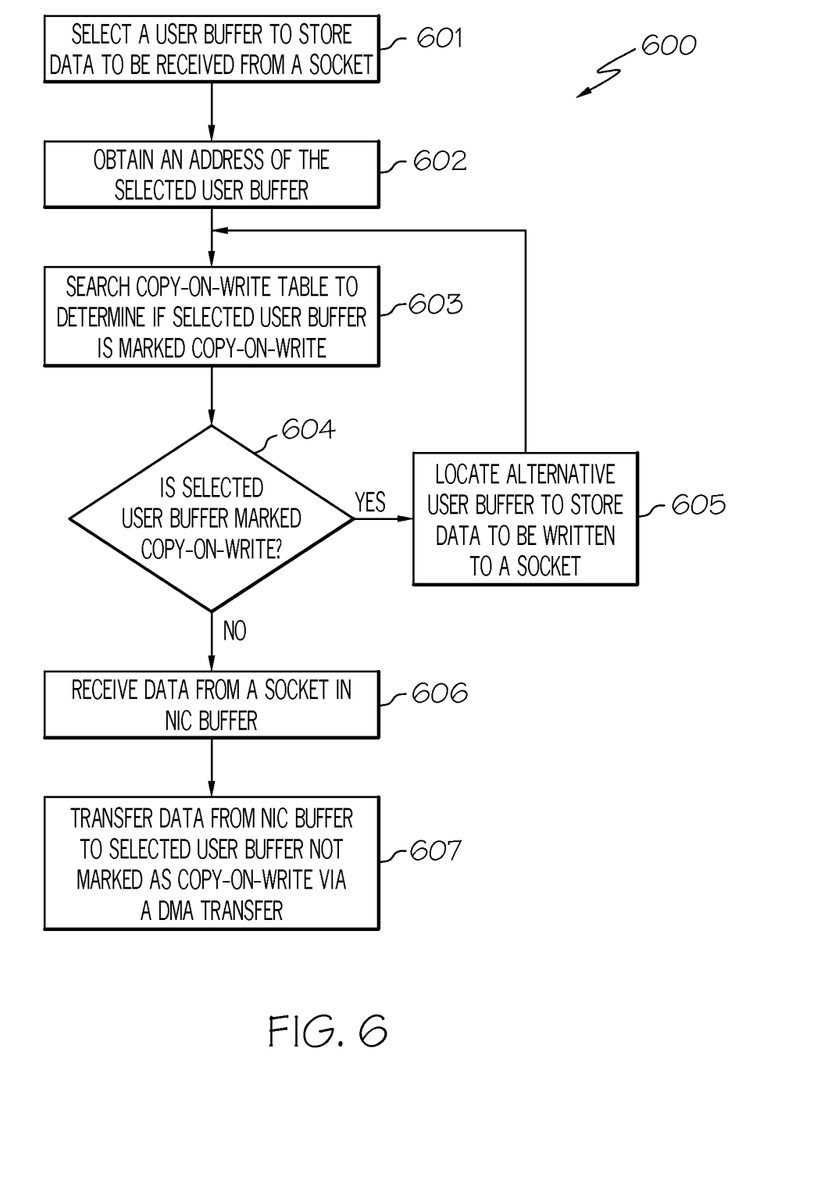
FIG. 6 is a flowchart of a method for determining if a user buffer is marked copy-on-write in connection with reading data from a socket in accordance with an embodiment of the present invention.
Figure 7:
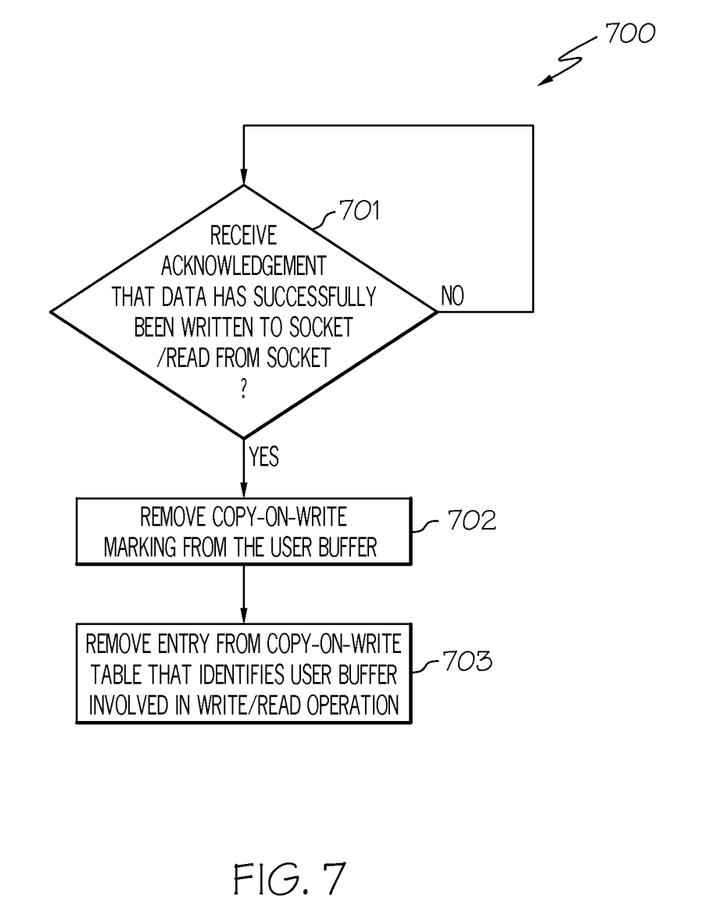
FIG. 7 is a flowchart of a method for removing an entry in the copy-on-write table by the kernel when an acknowledgement is received.

The principles of the present invention provide a technique for determining if the buffer in user space is marked copy-on-write by implementing a table, referred to herein as the "copy-on-write" table, as discussed below in connection with FIGS. 2-7. FIG. 2 illustrates the components of virtual memory that are involved in the write/read operations. FIG. 3 illustrates a copy-on-write table used to store the addresses of the buffers in user space that are marked copy-on-write by the kernel. FIG. 4 is a flowchart of a method for creating an entry in the copy-on-write table by the kernel. FIG. 5 is a flowchart of a method for determining if a buffer in user space is marked copy-on-write in connection with writing data to a socket (an endpoint for communication between two machines). FIG. 6 is a flowchart of a method for determining if a buffer in user space is marked copy-on-write in connection with reading data from a socket. FIG. 7 is a flowchart of a method for removing an entry in the copy-on-write table by the kernel when an acknowledgement is received.

Referring to FIG. 2, in conjunction with FIG. 1, as stated above, FIG. 2 illustrates the components of virtual memory that are involved in the write/read operations in accordance with an embodiment of the present invention. A conventional operating system 103 usually segregates virtual memory 201 into user space 202 and kernel space 203. User space 202 is the memory area where all user mode applications work; whereas, kernel space 203 is strictly reserved for running the kernel, kernel extensions, and most device drivers.

In connection with writing data to a socket/remote host, the data to be written is stored in a user buffer 204 in user space 202. System 100 then initiates a Direct Memory Access (DMA) transfer 205 to transfer the data from user buffer 204 to a buffer 206 in Network Interface card (NIC) 109. The data will then be sent to the socket.

Furthermore, in connection with writing data to a socket, the control data 207 is sent to a buffer, referred to herein as the "socket buffer" 208, in kernel space 203 which is later transferred 209 to NIC buffer 206.

While FIG. 2 illustrates writing data to a socket, the principles of the present invention apply to reading data from a socket where there is a DMA transfer from NIC buffer 206 to user buffer 204 and there is a transfer of the control data from NIC buffer 206 to socket buffer 208 and then a transfer of the control data from socket buffer 208 to user buffer 204.

Furthermore, while FIG. 2 illustrates a single user buffer 204, a single socket buffer 208 and a single NIC buffer 206, any number of user buffers 204, socket buffers 208 and NIC buffers 206 may be implemented.

As discussed above, the user application does not know if user buffer 204 is marked copy-on-write, and, as a result, may modify user buffer 204 that is marked copy-on-write prior to the receipt of the acknowledgement (i.e., the acknowledgement that the data was written to a socket/received from a socket) thereby losing the benefit of implementing the copy-on-write strategy. The principles of the present invention provide a technique for allowing the user application to determine if user buffer 204 is marked copy-on-write by implementing a "copy-on-write" table as discussed below in connection with FIG. 3.

Referring to FIG. 3, FIG. 3 illustrates an embodiment of the present invention of a "copy-on-write" table 300 that includes addresses of user buffers 204 that are marked copy-on-write by the kernel. For example, user buffer 204 that is marked with copy-on-write (identified by element 301) is associated with the address 0x020BE0 which is listed in an entry in copy-on-write table 300. Table 300 also includes the addresses of other user buffers 204 that are marked copy-on-write by the kernel, such as addresses 0x030BE0, 0x032BE0, and 0x036BE0. The kernel enters these addresses into copy-on-write table 300 prior to marking these user buffers 204 as copy-on-write which is discussed below in connection with FIG. 4.

FIG. 4 is a flowchart of a method 400 for creating an entry in copy-on-write table 300 by the kernel when the kernel decides to mark user buffer 204 as copy-on-write in accordance with an embodiment of present invention.

Referring to FIG. 4, in conjunction with FIGS. 1-3, step 401, the kernel receives user buffer 204 for writing data to a socket or for reading data from a socket.

In step 402, a determination is made by the kernel as to whether user buffer 204 can be marked copy-on-write. User buffer 204 can be marked copy-on-write if it is page aligned and meets other requirements that the kernel requires. If user buffer 204 is not page aligned or it does not meet one or more requirements that the kernel requires, then user buffer 204 will not be marked copy-on-write.

If user buffer 204 can not be marked copy-on-write, then, in step 403, the data is sent to the socket or read from the socket in the traditional way (as discussed in the Background section).

If, however, user buffer 204 can be marked, then, in step 404, the kernel enters the address of user buffer 204 in copy-on-write table 300.

In step 405, the kernel marks user buffer 204 as copy-on-write so that the contents of user buffer 204 are not copied to kernel space 203.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

A method for implementing copy-on-write table 300 for determining if user buffer 204 is marked copy-on-write is discussed below in association with FIG. 5.

FIG. 5 is a flowchart of a method 500 for determining if a user buffer 204 (FIG. 2) is marked copy-on-write in connection with writing data to a socket in accordance with an embodiment of the present invention.

Referring to FIG. 5, in conjunction with FIGS. 1-3, in step 501, the user application selects a user buffer 204 in user space 202 to store data to be written to a socket.

In step 502, the user application obtains an address of the selected user buffer 204.

In step 503, the user application searches copy-on-write table 300 to determine if the selected user buffer 204 is marked copy-on-write.

In step 504, a determination is made by the user application as to whether the selected user buffer 204 is marked copy-on-write. In one embodiment, the user application searches table 300 to determine if the address of the selected user buffer 204 is included in one of the entries of table 300. If the address is listed in table 300, then the selected user buffer 204 is marked copy-on-write. If the address is not listed in table 300, then the selected user buffer 204 is not marked copy-on-write. By having a table, such as table 300, store a list of addresses of user buffers 204 that are marked copy-on-write by the kernel, the user application is now able to know whether user buffer 204 is marked copy-on-write.

If the selected user buffer 204 is marked copy-on-write, then, in step 505, the user application locates an alternative user buffer 204 in user space 202 to store the data to be written to the socket. The user application then searches the copy-on-write table 300 to determine if the alternative user buffer 204 is marked copy-on-write in step 503.

If, however, the selected user buffer 204 is not marked copy-on-write, then, in step 506, the user application stores the data in the selected user buffer 204 to be written to the socket.

In step 507, the data is transferred from the selected user buffer 204 to NIC buffer 206 via a DMA transfer 205.

In step 508, the data is sent to the socket.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

As discussed above, in addition to data being written to a socket, data may be read from a socket. A method for determining if a user buffer 204 is marked copy-on-write in connection with reading data from a socket is provided below in connection with FIG. 6.

FIG. 6 is a flowchart of a method 600 for determining if a user buffer 204 (FIG. 2) is marked copy-on-write in connection with reading data from a socket in accordance with an embodiment of the present invention.

Referring to FIG. 6, in conjunction with FIGS. 1-3, in step 601, the user application selects a user buffer 204 in user space 202 to store data to be received from a socket.

In step 602, the user application obtains an address of the selected user buffer 204.

In step 603, the user application searches copy-on-write table 300 to determine if the selected user buffer 204 is marked copy-on-write.

In step 604, a determination is made by the user application as to whether the selected user buffer 204 is marked copy-on-write. In one embodiment, the user application searches table 300 to determine if the address of the selected user buffer 204 is included in one of the entries of table 300. If the address is listed in table 300, then the selected user buffer 204 is marked copy-on-write. If the address is not listed in table 300, then the selected user buffer 204 is not marked copy-on-write. By having a table, such as table 300, store a list of addresses of user buffers 204 that are marked copy-on-write by the kernel, the user application is now able to know whether user buffer 204 is marked copy-on-write.

If the selected user buffer 204 is marked copy-on-write, then, in step 605, the user application locates an alternative user buffer 204 in user space 202 to store the data to be received from the socket. The user application then searches the copy-on-write table 300 to determine if the alternative user buffer 204 is marked copy-on-write in step 603.

If, however, the selected user buffer 204 is not marked copy-on-write, then, in step 606, NIC buffer 206 receives data from a socket which is transferred to the selected user buffer 204 via a DMA transfer 205 in step 607.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

As discussed above, the kernel marks appropriate user buffers 204 (FIG. 2) to be "copy-on-write" if the data stored in that user buffer 204 is not to be copied to a buffer in kernel space 203. The addresses of those user buffers 204 that are marked copy-on-write are stored in "copy-on-write" table 300 (FIG. 3). The process for the kernel to remove an entry in table 300 containing an address of a user buffer 204 when an acknowledgement is received (i.e., an acknowledgement that the data was written to a socket/received from a socket using that user buffer 204) is discussed below in connection with FIG. 7.

FIG. 7 is a flowchart of a method 700 for removing an entry in copy-on-write table 300 by the kernel when an acknowledgement is received in accordance with an embodiment of the present invention.

Referring to FIG. 7, in conjunction with FIGS. 1-3, in step 701, a determination is made by the kernel as to whether it received an acknowledgement from the remote host that the data has successfully been written to a socket/read from a socket.

If an acknowledgement has been received from the remote host, then, in step 702, the kernel removes the copy-on-write marking from user buffer 204 involved in the write or read operation (i.e., involved in the operation to write data to a socket or read data from a socket).

In step 703, the kernel removes the entry in table 300 that identifies user buffer 204 involved in the write or read operation.

If, however, an acknowledgement has not been received, then the kernel makes a subsequent determination as to whether it received an acknowledgement from the remote host that the data has successfully been written to a socket/read from a socket in step 701.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for determining if a buffer is marked copy-on-write, the method comprising:
   selecting a buffer in user space to store data;
   obtaining an address of said selected buffer in user space;
   searching a table storing one or more addresses of buffers in user space that are marked copy-on-write to determine if said address of said selected buffer is listed in said table; and
   selecting, by a user application whose instructions are executed by processor, an alternative buffer in user space to store data in response to said selected buffer being marked copy-on-write in said table.

2. The method as recited in claim 1, wherein said buffer in user space is selected to store data to be written to a socket.

3. The method as recited in claim 2 further comprising:
   transferring said data from said selected buffer in user space to a network interface card via a direct memory access transfer in response to said selected buffer not being marked copy-on-write in said table; and
   sending said data to said socket.

4. The method as recited in claim 1, wherein said buffer in user space is selected to store data to be received from a socket.

5. The method as recited in claim 4 further comprising:
   receiving said data from said socket in a buffer of a network interface card; and
   transferring said data from said buffer of said network interface card to said selected buffer in user space in response to said selected buffer not being marked copy-on-write in said table.

6. The method as recited in claim 1 further comprising:
   storing data in said selected buffer in response to said address of said selected buffer not being listed in said table.

7. The method as recited in claim 1 further comprising:
   receiving an acknowledgement that data stored in a buffer in user space that is marked copy-on-write has successfully been one of written to a socket and read from said socket; and
   removing an entry storing an address of said buffer in user space from said table in response to receipt of said acknowledgement.

8. A computer program product embodied in a computer readable storage medium for determining if a buffer is marked copy-on-write, the computer program product comprising the programming instructions for:
   selecting a buffer in user space to store data;
   obtaining an address of said selected buffer in user space;
   searching a table storing one or more addresses of buffers in user space that are marked copy-on-write to determine if said address of said selected buffer is listed in said table; and
   selecting an alternative buffer in user space to store data in response to said selected buffer being marked copy-on-write in said table.

9. The computer program product as recited in claim 8, wherein said buffer in user space is selected to store data to be written to a socket.

10. The computer program product as recited in claim 9 further comprising the programming instructions for:
    transferring said data from said selected buffer in user space to a network interface card via a direct memory access transfer in response to said selected buffer not being marked copy-on-write in said table; and
    sending said data to said socket.

11. The computer program product as recited in claim 8, wherein said buffer in user space is selected to store data to be received from a socket.

12. The computer program product as recited in claim 11 further comprising the programming instructions for:
    receiving said data from said socket in a buffer of a network interface card; and
    transferring said data from said buffer of said network interface card to said selected buffer in user space in response to said selected buffer not being marked copy-on-write in said table.

13. The computer program product as recited in claim 8 further comprising the programming instructions for:
    storing data in said selected buffer in response to said address of said selected buffer not being listed in said table.

14. The computer program product as recited in claim 8 further comprising the programming instructions for:
receiving an acknowledgement that data stored in a buffer in user space that is marked copy-on-write has successfully been one of written to a socket and read from said socket; and
removing an entry storing an address of said buffer in user space from said table in response to receipt of said acknowledgement.

15. A system, comprising:
a memory unit for storing a computer program for determining if a buffer is marked copy-on-write; and
a processor coupled to said memory unit, wherein said processor, responsive to said computer program, comprises:
circuitry for selecting a buffer in user space to store data;
circuitry for obtaining an address of said selected buffer in user space;
circuitry for searching a table storing one or more addresses of buffers in user space that are marked copy-on-write to determine if said address of said selected buffer is listed in said table; and
circuitry for selecting, by a user application whose instructions are executed by processor, an alternative buffer in user space to store data in response to said selected buffer being marked copy-on-write in said table.

16. The system as recited in claim 15, wherein said buffer in user space is selected to store data to be written to a socket.

17. The system as recited in claim 16, wherein said processor further comprises:
circuitry for transferring said data from said selected buffer in user space to a network interface card via a direct memory access transfer in response to said selected buffer not being marked copy-on-write in said table; and
circuitry for sending said data to said socket.

18. The system as recited in claim 15, wherein said buffer in user space is selected to store data to be received from a socket.

19. The system as recited in claim 18, wherein said processor further comprises:
circuitry for receiving said data from said socket in a buffer of a network interface card; and
circuitry for transferring said data from said buffer of said network interface card to said selected buffer in user space in response to said selected buffer not being marked copy-on-write in said table.

20. The system as recited in claim 15, wherein said processor further comprises:
storing data in said selected buffer in response to said address of said selected buffer not being listed in said table.

* * * * *